(12) United States Patent
Miyawaki et al.

(10) Patent No.: US 8,758,980 B2
(45) Date of Patent: *Jun. 24, 2014

(54) OPTICAL INFORMATION RECORDING MEDIUM AND METHOD OF RECORDING AND/OR REPRODUCING THEREIN

(75) Inventors: Manami Miyawaki, Kanagawa (JP); Yuji Kuroda, Tokyo (JP)

(73) Assignee: Sony Corporation, Tokyo (JP)

( * ) Notice: Subject to any disclaimer, the term of this patent is extended or adjusted under 35 U.S.C. 154(b) by 884 days.

This patent is subject to a terminal disclaimer.

(21) Appl. No.: 12/304,119

(22) PCT Filed: Feb. 19, 2008

(86) PCT No.: PCT/JP2008/052700
§ 371 (c)(1),
(2), (4) Date: Dec. 10, 2008

(87) PCT Pub. No.: WO2008/129895
PCT Pub. Date: Oct. 30, 2008

(65) Prior Publication Data
US 2009/0268579 A1  Oct. 29, 2009

(30) Foreign Application Priority Data
Apr. 16, 2007 (JP) ................. 2007-107124

(51) Int. Cl.
*G11B 7/24* (2013.01)
*G11B 7/2433* (2013.01)
*G11B 7/2437* (2013.01)
*G11B 7/243* (2013.01)

(52) U.S. Cl.
CPC ............ *G11B 7/2433* (2013.01); *G11B 7/2437* (2013.01); *G11B 2007/24318* (2013.01); *G11B 2007/2432* (2013.01); *G11B 2007/24304* (2013.01); *G11B 2007/2431* (2013.01); *G11B 2007/24314* (2013.01); *G11B 2007/24306* (2013.01); *G11B 2007/24302* (2013.01)
USPC ................ 430/270.13; 369/275.2; 369/275.5; 369/288; 428/64.6; 428/64.4

(58) Field of Classification Search
None
See application file for complete search history.

(56) References Cited

U.S. PATENT DOCUMENTS 3,971,874 A    7/1976  Ohta et al.
4,405,706 A *  9/1983  Takahashi et al. ....... 430/270.12

(Continued)

FOREIGN PATENT DOCUMENTS

EP    1 388 853 A2    2/2004
JP    54 7458         4/1979

(Continued)

OTHER PUBLICATIONS

Translation JP-05-124353(May 1993).*

(Continued)

*Primary Examiner* — Martin Angebranndt
(74) *Attorney, Agent, or Firm* — Oblon, Spivak, McClelland, Maier & Neustadt, L.L.P.

(57) ABSTRACT

An optical information recording medium 1 is constructed by sequentially layering a reflective layer 11, a protective layer 12, a recording layer 13, a protective layer 14, and a light transmissive protective layer 15 on a substrate 10. As the recording layer 13, a recording layer containing ZnS, $SiO_2$, and Sb as principal components, or preferably, a recording layer expressed by a compositional formula $[(ZnS)_x (SiO_2)_{1-x}]_y (Sb_z X_{1-z})_{1-y}$ (where $0<x\leq1.0$, $0.3\leq y\leq0.7$, and $0.8<z\leq1.0$ are met and X denotes at least one element selected from a group of Ga, Te, V, Si, Zn, Ta, and Tb) is adopted.

14 Claims, 17 Drawing Sheets

(56) References Cited

U.S. PATENT DOCUMENTS

| | | | |
|---|---|---|---|
| 4,499,178 A * | 2/1985 | Wada et al. | 430/270.12 |
| 4,820,394 A * | 4/1989 | Young et al. | 204/192.26 |
| 5,169,745 A * | 12/1992 | Yashiro et al. | 430/270.13 |
| 6,108,295 A | 8/2000 | Ohno et al. | |
| 6,115,352 A | 9/2000 | Ohno et al. | |
| 6,544,617 B1 | 4/2003 | Tyan et al. | |
| 6,605,330 B2 | 8/2003 | Tyan et al. | |
| 7,149,176 B2 * | 12/2006 | Lee et al. | 369/275.3 |
| 8,389,098 B2 * | 3/2013 | Miyawaki et al. | 428/64.1 |
| 8,394,479 B2 * | 3/2013 | Wada | 428/64.1 |
| 8,449,964 B2 * | 5/2013 | Tabata et al. | 428/64.1 |
| 8,470,428 B2 * | 6/2013 | Tabata | 428/64.1 |
| 2003/0099805 A1 | 5/2003 | Tyan et al. | |
| 2004/0037203 A1 | 2/2004 | Harigaya et al. | |
| 2004/0152016 A1 | 8/2004 | Mishima et al. | |
| 2004/0191683 A1 | 9/2004 | Nishihara et al. | |
| 2005/0276946 A1 | 12/2005 | Sabi et al. | |
| 2007/0002695 A1 | 1/2007 | Kariyada et al. | |
| 2010/0187099 A1 * | 7/2010 | Wada | 204/192.26 |
| 2010/0278032 A1 * | 11/2010 | Miyawaki et al. | 369/283 |
| 2011/0059285 A1 * | 3/2011 | Kikuchi et al. | 428/64.7 |
| 2012/0015133 A1 * | 1/2012 | Tabata | 428/64.5 |
| 2013/0052389 A1 * | 2/2013 | Miki et al. | 428/64.4 |

FOREIGN PATENT DOCUMENTS

| | | | |
|---|---|---|---|
| JP | 57-135197 | * | 8/1982 |
| JP | 61177284 | * | 8/1986 |
| JP | 62 204442 | | 9/1987 |
| JP | 62-246158 | * | 10/1987 |
| JP | 62-275335 | | 11/1987 |
| JP | 63-61432 | | 3/1988 |
| JP | 63-142541 | | 6/1988 |
| JP | 63 142541 | | 6/1988 |
| JP | 63-173241 | | 7/1988 |
| JP | 63 173241 | | 7/1988 |
| JP | 5 124353 | | 5/1993 |
| JP | 8 104060 | | 4/1996 |
| JP | 10 172179 | | 6/1998 |
| JP | 11 235873 | | 8/1999 |
| JP | 3066088 | | 5/2000 |
| JP | 2001 236690 | | 8/2001 |
| JP | 2003 72244 | | 3/2003 |
| JP | 2003 182237 | | 7/2003 |
| JP | 2004-095092 | * | 3/2004 |
| JP | 2004-224040 | | 8/2004 |
| JP | 2004 224040 | | 8/2004 |
| JP | 2004-310992 | | 11/2004 |
| JP | 2004 310992 | | 11/2004 |
| JP | 2005 125726 | | 5/2005 |
| JP | 2005 129192 | | 5/2005 |
| JP | 2006-4594 | | 1/2006 |
| JP | 2006-181887 | | 7/2006 |
| JP | 2006 181887 | | 7/2006 |
| JP | 2006 281751 | | 10/2006 |
| WO | 2005 023553 | | 3/2005 |

OTHER PUBLICATIONS

Translation JP-2003-072244(Mar. 2003).*
Office Action issued Dec. 7, 2010, in Japan Patent Application No. 2007-107124.
U.S. Appl. No. 12/808,320, filed Jun. 15, 2010, Miyawaki, et al.
Search Report issued Dec. 14, 2011 in Europe Application No. 08711524.2.

* cited by examiner

OPTICAL INFORMATION RECORDING MEDIUM AND METHOD OF RECORDING AND/OR REPRODUCING THEREIN

TECHNICAL FIELD

The present invention relates to an optical information recording medium and its recording and/or reading method. The present invention is preferably adapted especially to a write-once optical information recording medium.

BACKGROUND ART

In optical information recording media including a CD and a DVD, an organic dye material has mainly been used as a write-once optical information recording medium material so far. The reason is that when the organic dye material is used, it is relatively easy to sustain interchangeability with a read-only memory (ROM), for which a relatively high reflectance is requested under the standards, over a wavelength band of laser light that is used for recording or reading. Moreover, the recording medium can be produced through a simple process of forming a reflective layer according to a sputtering method after spin-coating the organic dye. The use of the organic dye material is advantageous in terms of a cost of manufacture such as plant investment.

However, since the wavelength of laser light to be employed in recording or reading has gotten shorter and laser light in a wavelength band of blue violet (wavelength of about 400 nm) has come to be used, circumstances become different. Specifically, it is not easy to prepare an organic dye, which can cope with the laser light of the wavelength, in terms of recording sensitivity and a signal property. The layer construction of a recording medium cannot be readily accomplished through the conventional simple process. Further, the fact that when the recording medium is manufactured according to the spin coat method, the homogeneity of a land part with a groove part cannot be retained has been found apparently disadvantageous in terms of a push-pull signal or crosstalk in high-density recording.

In order to meet the requirements, the employment of an inorganic recording material instead of the organic dye material is currently encouraged in earnest. The practical use of a recording medium employing the inorganic recording material has been shelved because the recording medium is hardly interchangeable with the ROM of a high reflectance and an expensive sputtering apparatus is needed to form many layers of the material, though the recording medium has been studied in the past. However, the dependency of the inorganic recording material on the wavelength of employed laser light is generally not as high as that of the organic material is. Moreover, formation of many recording layers that has often been performed in recent years (inclusion of many recording layers makes the recording capacity of an optical disk of the same size two or more times larger) can be more readily achieved than employment of the organic dye material. Therefore, the use of the inorganic recording material as a new-generation optical recording material in place of the organic dye material has become a mainstream, and the inorganic recording material has been put to practical use.

As the inorganic recording material, various types of materials have been proposed in the past. For example, an optical recording medium employing a recording layer that has two or more layers of thin films made of different metallic materials joined has been proposed (refer to a patent document 1). In the optical recording medium, a multilayer film is partly recomposed into an alloy to form a single film using heat dissipated with irradiation of laser light in order to form record marks. As applied examples of this method, various forms have been proposed with the material varied differently (refer to, for example, a patent document 2). Moreover, a write-once optical recording medium using an oxide compound for the recording layer has been proposed (refer to, for example, patent documents 3 and 4).

However, the foregoing recording media cannot be said to fully satisfy all conditions required for the write-once optical information recording medium. Specifically, required are that information recorded in the write-once optical information recording medium is preserved stably over a long period as it initially is (archival property), that a signal is not impaired by reading laser light during signal reading (reading stability), and that the writing property is sustained without degeneration caused by normal long-term preservation (shelf-life property). The aforesaid conventional recording media cannot be said to satisfactorily have these properties. Moreover, from the viewpoints of a cost of manufacture of a recording medium or reserve of a margin in a manufacturing process, the number of layers constituting a recording medium is requested to be as small as possible, and the manufacturing process is requested to be simple. Moreover, sufficient sensitivity and a sufficient response speed are desired in terms of recording and reading properties. Thus, an excellent recording/reading signal is guaranteed for a wide range of linear velocities.

Proposed as an optical recording medium employing an inorganic recording material are: a medium having a recording layer made of an alloy containing Zn, Sn, Sb, and Te (refer to a patent document 5); a medium having a recording layer made of a recording material that contains as a principal component a compound expressed as $A_xB_{1-x}$ (where A denotes at least one element selected from a group of Zn, Ga, In, Si, Ge, Sn, Bi, and Sb, B denotes at least one element selected from a group of Se, Te, S, and O, and x denotes a compositional ratio determined with a range (2.0 to 3.0) of values of a mean coordination number) (refer to a patent document 6); a medium having a recording layer formed with an alloy thin film expressed as $M_w((Sb_zTe_{1-z})_{1-w}$ ($0 \leq w < 0.3$, $0.5 \leq z < 0.9$, and M denotes at least one element selected from a group of In, Ga, Zn, Ge, Sn, Si, Cu, Au, Ag, Pd, Pt, Pb, Cr, Co, O, S, and Se) (refer to patent documents 7 and 8); a medium having a recording layer made of one material that contains Te as a principal component, contains as a secondary component an alloy that contains at least one element, which is selected from a group of Ge, Sb, Bi, Se, S, As, Tl, In, Ga, Au, Ag, Cu, Pd, Pt, Ni, and Co, by an atomic percent equal to or larger than 30 and smaller than 60 in total, and contains as an additive at least one material selected from a group of ZnS, ZnTe, ZnSe, $SiO_2$, $TiO_2$, $Al_2O_3$, TiC, ZrC, and HfC (refer to a patent document 9); a medium including a recording layer that has a composition expressed as $Sb_aIn_bSn_cZn_dSi_eO_fS_h$ where a>0, b>0, c>0, d>0, e>0, f>0, h>0, and a+b+c+d+e+f+h=100 are met (refer to a patent document 10); a medium including a recording layer that has a composition expressed as $Sb_aX_bSn_cZn_dSi_eO_fS_h$ where X denotes an element selected from among In, Ge, Al, Zn, Mn, Cd, Ga, Ti, Si, Te, Nb, Fe, Co, W, Mo, S, Ni, O, Se, Tl, As, P, Au, Pd, Pt, Hf, and V, and a>0, b>0, c>0, d>0, e>0, f>0, h>0, and a+b+c+d+e+f+h=100 are met (refer to a patent document 11); and a medium including a recording layer that contains at least one metal M selected from a group of Ni, Cu, Si, Ti, Ge, Zr, Nb, Mo, In, Sn, W, Pb, Bi, Zn, and La, and an element X which binds with the metal M when being irradiated a recording laser beam so as to produce a crystal of a compound with the metal M (refer to patent documents 12 and 13).

Patent document 1: JP-A-62-204442
Patent document 2: Japanese Patent No. 3066088
Patent document 3: JP-B-54-7458
Patent document 4: JP-A-2006-281751
Patent document 5: JP-A-11-235873
Patent document 6: JP-A-8-104060
Patent document 7: JP-A-10-172179
Patent document 8: JP-A-2001-236690
Patent document 9: JP-A-5-124353
Patent document 10: JP-A-2003-72244
Patent document 11: JP-A-2003-182237
Patent document 12: JP-A-2005-125726
Patent document 13: JP-A-2005-129192

DISCLOSURE OF THE INVENTION

Problems to be Solved by the Invention

As mentioned above, there has been difficulty in inexpensively providing a write-once optical information recording medium in which: recorded information is stably preserved for a long period as it initially is; a signal is not impaired by reading laser light during signal reading; the writing property is retained without degeneration caused by normal long-term preservation; satisfactory sensitivity and a satisfactory response speed are offered; and excellent recording and reading properties can be realized with respect to a wide range of linear velocities or recording powers.

A problem to be solved by the present invention is to provide an optical information recording medium that satisfies all the above conditions, and its recording and/or reading method.

Means for Solving the Problem

The present inventor et al. have made studies in efforts to solve the above problem. Consequently, the present inventor et al. have found and experimentally verified that the foregoing conditions can be satisfied by adopting a material, which contains ZnS, $SiO_2$, and Sb as principal components, as a material of a recording layer of an optical information recording medium, and come to devise the present invention.

In order to solve the problem, the first invention provides an optical information recording medium characterized in which it includes a recording layer which contains ZnS, $SiO_2$, and Sb as principal components.

The second invention provides a recording and/or reading method for an optical information recording medium including a recording layer which contains ZnS, $SiO_2$, and Sb as principal components.

The recording and/or reading method is characterized in that recording and/or reading is performed by causing laser light, of which wavelength is equal to or larger than 385 nm and equal to or smaller than 415 nm, to fall on the recording layer.

In the optical information recording medium, information is recorded by causing the recording layer to undergo a qualitative change, which is accompanied by a change in an optical constant, through irradiation of laser light.

The recording layer may contain, if necessary, in addition to ZnS, $SiO_2$, and Sb, at least one element selected from a group of Ga, Te, V, Si, Zn, Ta, and Tb. The recording layer preferably has a composition that satisfies a formula (1) below.

$$[(ZnS)_x(SiO_2)_{1-x}]_y(Sb_zX_{1-z})_{1-y} \quad (1)$$

where $0<x\leq1.0$, $0.3\leq y\leq0.7$, and $0.8<z\leq1.0$ are met, and X denotes at least one element selected from a group of Ga, Te, V, Si, Zn, Ta, and Tb.

The thickness of the recording layer is determined from necessity. For excellent recording and reading properties, the thickness is preferably equal to or larger than 3 nm and equal to or smaller than 40 nm.

In the optical information recording medium, typically, the recording layer is present on a substrate. The optical information recording medium may be provided with, in addition to the recording layer, a reflective layer made of a metal or a semi-metal or a protective layer formed with a dielectric so that it can exhibit desired recording and reading properties. The number of layers and the sequence thereof can be freely selected according to the desired recording and reading properties. Typically, the optical information recording medium has the reflective layer interposed between the substrate and recoding layer. Laser light for recording and/or reading falls on the recording layer side of the optical information recording medium. The reflective layer is typically made of a metal and/or a semi-metal which ensures a high reflectance. The optical information recording medium includes the protective layer that is placed in contact with the surface of the recording medium on at least one side thereof and that is formed with a dielectric. Otherwise, the optical information recording medium includes the reflective layer interposed between the substrate and recording layer, and the protective layer that is interposed between the reflective layer and recording layer in contact with the surface of the recording layer on one side thereof and that is formed with a dielectric. The recording and/or reading laser light falls on the recording layer side of the optical information recording medium. Otherwise, the optical information recording medium includes the reflective layer interposed between the substrate and recording layer, a first protective layer that is interposed between the reflective layer and recording layer in contact with the surface of the recording layer on one side thereof and that is formed with a dielectric, and a second protective layer that is placed in contact with the surface of the recording layer on the side thereof opposite to the substrate and that is formed with a dielectric. The recording and/or reading laser light falls on the recording layer side of the optical information recording medium.

The optical information recording medium may include one recording layer or may include multiple recording layers, that is, may be a multilayer optical information recording medium. Since the optical information recording medium including the recording layer that contains ZnS, $SiO_2$, and Sb as principal components or has the composition satisfying the formula (1) exhibits a high reflectance and a wide power margin, the multilayer optical information recording medium may typically include, as a recording layer farthest away from the incidence/emission side for the recording and/or reading laser light, the recording layer which contains ZnS, $SiO_2$, and Sb as principal components or has the composition satisfying the formula (1). As a recording layer other than the farthest recording layer, a recording layer of a known write-once type or rewritable type or a recording layer permitting reading alone may be adopted.

The wavelength of laser light to be used to perform recording and/or reading on the optical information recording medium is typically equal to or larger than 385 nm and equal to or smaller than 415 nm. However, the present invention is not limited to the wavelengths.

In the first and second inventions having the foregoing constructions, the recording layer that contains ZnS, $SiO_2$, and Sb as principal components, or especially, the recording layer that has the composition expressed as $[(ZnS)_x(SiO_2)_{1-x}]_y$ $(Sb_zX_{1-z})_{1-y}$ is superb in stability and exhibits excellent sensitivity and an excellent response speed with respect to laser light whose wavelength is equal to larger than 385 nm and equal to or smaller than 415 nm.

Advantage of the Invention

According to the present invention: recorded information is stably preserved for a long period as it initially is; a signal is not impaired by reading laser light during signal reading; a writing property is sustained without degradation caused by normal long-term preservation; since not only the number of layers constituting a recording medium is small but also a manufacturing process is simple, a cost of manufacture of the recording medium and a margin in the manufacturing process can be ensured; satisfactory sensitivity and a satisfactory response speed are offered for recording and/or reading laser light; excellent recording and reading properties are exhibited relative to a wide range of linear velocities or recording powers; dependency on the wavelength of the recording and/or reading laser light is limited; initialization is unnecessary; satisfactory stability is ensured even for the power of the reading laser light; and environmental reliability is high.

BEST MODE FOR CARRYING OUT THE INVENTION

Figure 1:
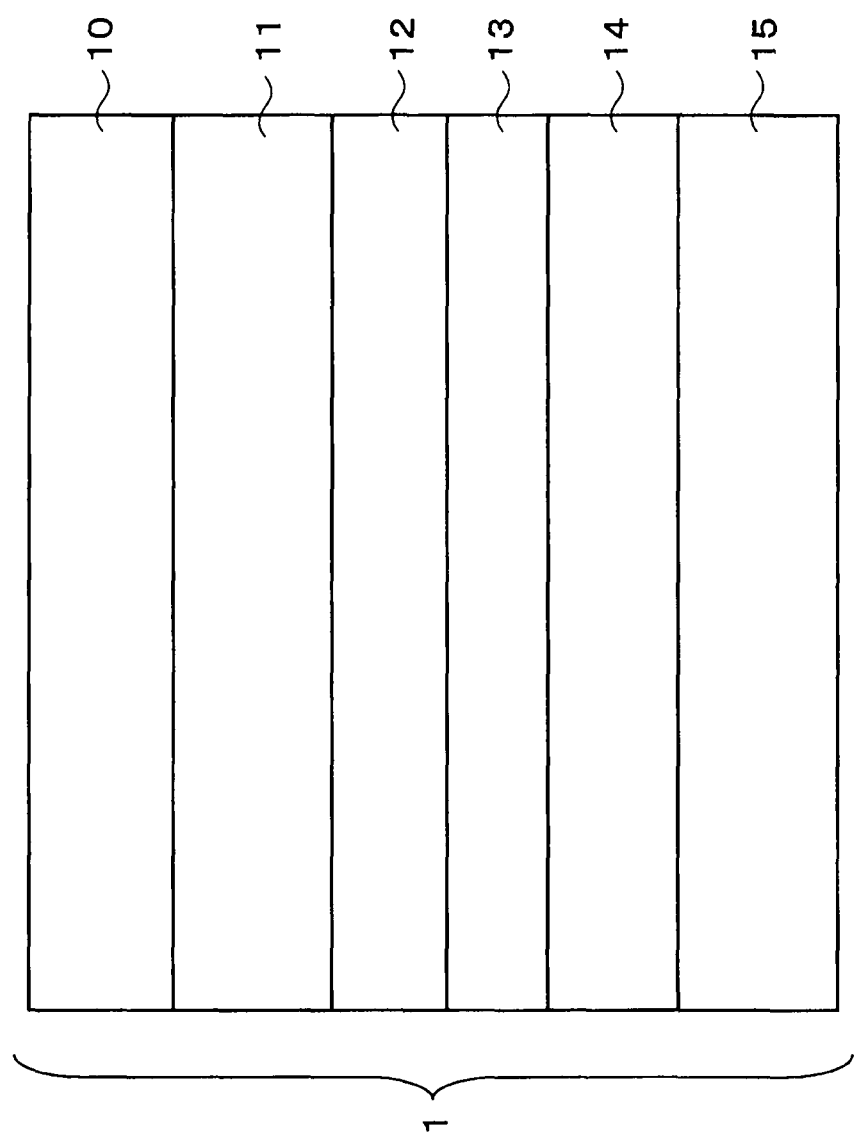
FIG. 1 is a schematic sectional view showing the major portion of an optical information recording medium in accordance with the first embodiment of the present invention.

Referring to the drawings, embodiments of the present invention will be described below. In all the drawings of the embodiments, the same reference numerals are assigned to identical or equivalent components.

FIG. 1 shows an optical information recording medium 1 in accordance with the first embodiment of the present invention.

As shown in FIG. 1, in the optical information recording medium 1, a reflective layer 11, a protective layer 12, a recording layer 13, a protective layer 14, and a light transmissive protective layer 15 are sequentially layered on a substrate 10. Recording/reading is performed on the optical information recording medium 1 by causing laser light, of which wavelength is, for example, equal to or larger than 385 nm and equal to or smaller than 415 nm, to enter or leave the light transmissive protective layer 15 side. The optical information recording medium 1 typically has a disk-like shape. However, the shape of the optical information recording medium 1 is not limited to the disk-like shape.

The recording layer 13 contains ZnS, $SiO_2$, and Sb as principal components, contains if necessary at least one element selected from a group of Zn, Ga, Te, V, Si, Ta, and Tb, and preferably has the composition expressed as the formula (1). As a forming method of the recording layer 13, a sputtering method is preferably adopted. However, the forming method of the recording layer 13 is not limited to the sputtering method.

The material, thickness, and forming method of the substrate 10 can be arbitrarily selected as long as desired properties are ensured. As the material to be made into the substrate 10, a plastic material such as polycarbonate or an acrylic resin is preferable in terms of a cost. However, the material of the substrate 10 is not limited to the plastic material. Any other material, for example, glass may be adopted. Moreover, in a case where recording/reading laser light enters or leaves the light transmissive protective layer 15 side, the substrate 10 need not be transparent. Therefore, a non-transparent material such as a metal may be adopted as the material of the substrate 10. When the plastic material is adopted for the substrate 10, an injection molding method or a photopolymer method (2P method) employing an ultraviolet-curable resin may be employed in formation of the substrate 10. The material and forming method of the substrate 10 are not limited to the above ones. Any material and forming method will do as long as a desired shape (for example, a disk-like shape having a thickness of 1.1 mm and a diameter of 120 mm) and the optical smoothness on the surface of the substrate 10 are satisfactorily guaranteed. The thickness of the substrate 10 is not limited to any specific value but is preferably equal to or larger than 0.3 mm and equal to smaller than 1.3 mm. When the thickness of the substrate 10 is smaller than 0.3 mm, the intensity of the optical information recording medium 1 may be degraded and the optical information recording medium 1 may be likely to warp. In contrast, if the thickness of the substrate 10 is larger than 1.3 mm, the thickness of the optical information recording medium 1 gets larger than the thickness of a CD or a DVD that is 1.2 mm. In this case, when a recording/reading drive compatible with all types of recording media is constructed, the same disk tray may not be used in common.

Moreover, concavo-convex groove tracks or pits may be formed in the surface of the substrate 10 on the side thereof on which the recording layer 13 and others are formed. In this case, recording/reading laser light can be guided by the grooves so that it can be moved to an arbitrary position on the optical information recording medium 1 or can acquire address information. Incidentally, as for the groove shape, various shapes including a spiral shape, a concentric shape, and a pit string can be adopted.

As the material of the reflective layer 11, a metal or a semi-metal generally usable for conventionally known optical disks, for example, an Ag alloy or an Al alloy can be arbitrarily selected and used based on properties the reflective layer 11 is requested to exhibit. Moreover, as the material of the reflective layer 11, a material having a heat-sink ability in addition to a light reflection ability should be employed. In this case, the reflective layer 11 can be provided with a function as a heat-sink layer.

The protective layers 12 and 14 are intended to protect the recording layer 13 and control the optical properties and thermal properties during recording/reading. As the material of the protective layers 12 and 14, a dielectric generally usable for conventionally known optical disks, such as, SiN, ZnS—$SiO_2$, or $Ta_2O_3$ can be arbitrarily selected and used based on properties the protective layers 12 and 14 are requested to exhibit.

As mentioned above, when recording/reading laser light is caused to enter or leave the light transmissive protective layer 15 side, the light transmissive protective layer 15 is preferably formed not to exhibit absorbency with respect to the laser light. Specifically, for example, the thickness of the light transmissive protective layer 15 is equal to or smaller than 0.3 mm. At this time, as the material of the light transmissive protective layer 15, a material whose transmittance relative to the recording/reading laser light is 90% or more is preferably selected. In particular, when the thickness of the light transmissive protective layer 15 ranges from 3 to 177 μm, if the high numerical aperture NA (for example, 0.85) of a lens included in a recording/reading optical system of a recording/reading drive for the optical information recording medium 1 is used in combination, high-density recording can be realized.

The construction and forming method of the light transmissive protective layer 15 are not limited to any specific ones as long as the foregoing conditions are satisfied. Specifically, the light transmissive protective layer 15 can be formed by applying an ultraviolet curable resin, which does not exhibit absorbency in the wavelength band of recording/reading laser light after being cured, by a desired thickness of 0.3 mm or less (for example, 0.1 mm) using a spin coater or the like, and then performing ultraviolet irradiation so as to cure the resin. Otherwise, the light transmissive protective layer 15 may be formed by placing a light transmissive sheet (film), which is optically smooth enough and made of a plastic material such as a polycarbonate resin or an acrylic resin of 0.3 mm or less thick, on an ultraviolet curable type adhesive, which is applied by a spin coat method in a thickness ranging from, for example, 5 to 15 μm, and then performing ultraviolet irradiation. Otherwise, the light transmissive protective layer may be formed by bonding the light transmissive sheet using an adhesive such as a pressure sensitive adhesive (PSA).

If necessary, a protective layer (not shown) made of an organic or inorganic material may be formed on the surface of the light transmissive protective layer 15 for the purpose of preventing dust from adhering to the surface of the light transmissive protective layer 15 or preventing formation of flaws in the surface of the light transmissive protective layer 15. The protective layer is also preferably made of a material that exhibits nearly no absorbency with respect to recording/reading laser light.

EXAMPLE 1

The optical information recording medium 1 on which recording/reading is performed by an optical disk recording/reading apparatus that employs two groups of objective lenses having a numerical aperture of 0.85 and a semiconductor laser light source which emits light at a wavelength of 405 nm within the wavelength band of blue violet was fabricated as mentioned below.

As the substrate 10, a polycarbonate substrate having grooves, which had a thickness of 1.1 mm, a track pitch of 0.32 μm, and a groove depth of 20 nm, in one side thereof was fabricated using an injection mold. On the polycarbonate substrate, an Ag alloy film of 100 nm thick serving as the reflective layer 11, a $Ta_2O_5$ film of 30 nm thick serving as the protective layer 12, the recording layer 13 of 20 nm thick, and a $Ta_2O_5$ film of 30 nm thick serving as the protective layer 14 were sequentially formed according to a sputtering method. Further, after an ultraviolet curable type adhesive was applied to the uppermost layer of the $Ta_2O_5$ film by a thickness of 15 μm according to a spin coat method, a light transmissive sheet (film) of 85 μm thick made of polycarbonate was placed on the adhesive, and ultraviolet irradiation was performed in order to form the light transmissive protective layer 15. Thus, the optical information recording medium 1 was fabricated.

For formation of the recording layer 13 according to the sputtering method, a single-substance target prepared by mixing ZnS, $SiO_2$, Sb, and Zn was used and an Ar gas was injected at 95 sccm. In this state, co-sputtering was performed. The composition of an obtained thin film was measured according to a Rutherford backscattering spectroscopy (RBS). The atomic number ratio was approximately Zn:Sb:Si:S:O=14:15:2:10:9. This is equivalent to the composition expressed as the formula (I) to which x=0.8, y=0.45, and z=0.9 are assigned.

The thus fabricated optical information recording medium 1 was measured. For the measurement, an ODU-1000 (laser light wavelength: 405 nm) manufactured by Pulstec Industrial Co., Ltd., a spectrum analyzer R3267 manufactured by Advantest Corp. and a jitter analyzer LE1876 manufactured by Leader Electronics Corp. were employed. Signal measurement was performed on the optical information recording medium 1 at a linear velocity of 4.92 m/s and a channel bit length of 74.50 nm which are conformable to the Blu-ray Disc 25-GB density standard. Signal recording was performed at, in addition to a linear velocity of 4.92 m/s, a double linear velocity of 9.84 m/s and a quadruple linear velocity of 19.68 m/s. For jitter measurement, a signal having been treated by a limit equalizer manufactured by Pulstec Industrial Co., Ltd. was employed. The equalizer gain was 7.0 dB.

Thus, recording/reading measurement was performed on the optical information recording medium 1. Under the linear velocity of 4.92 m/s (velocity that is one time higher), when a recording power was 4.9 mW, a jitter was 5.9%. Assuming that modulation was defined as (I8H-I8L)/I8H in relation to a signal level I8H for each 8T space part and a signal level I8L for each 8T mark part, the value was 53%. Thus, a quite excellent recording and reading properties were exhibited.

Moreover, under the double linear velocity of 9.84 m/s (velocity that is twice higher), when the recording power was 6.8 mW, the jitter was 6.3% and the modulation was 56%. Under the quadruple linear velocity of 19.68 m/s (velocity that is four times higher), when the recording power was 7.2 mW, the jitter was 5.9% and the modulation was 64%.

Figure 2:
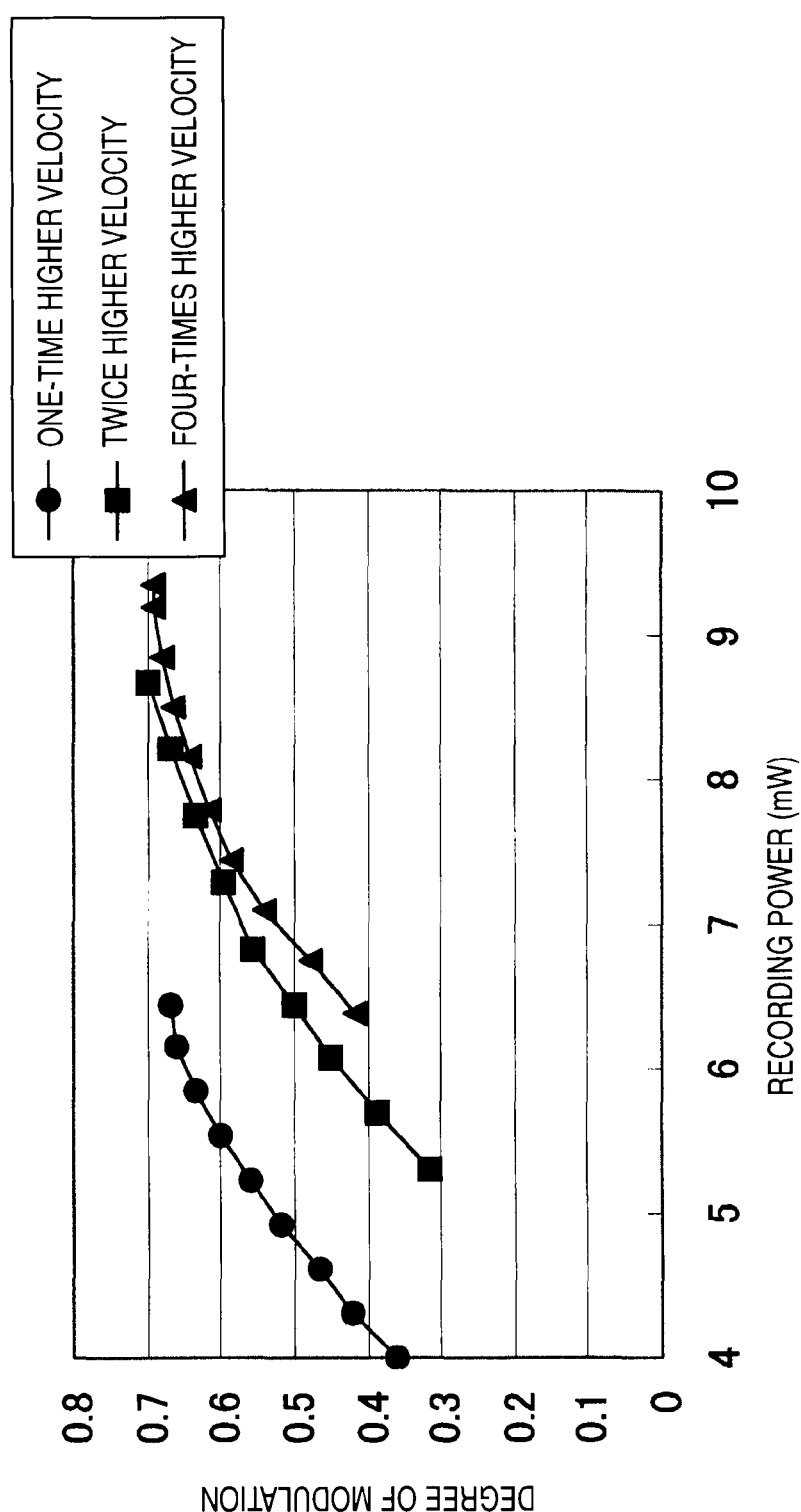
FIG. 2 is a schematic line graph showing a change in modulation with respect to the recording power for an optical information recording medium in accordance with an example 1.
Figure 3:
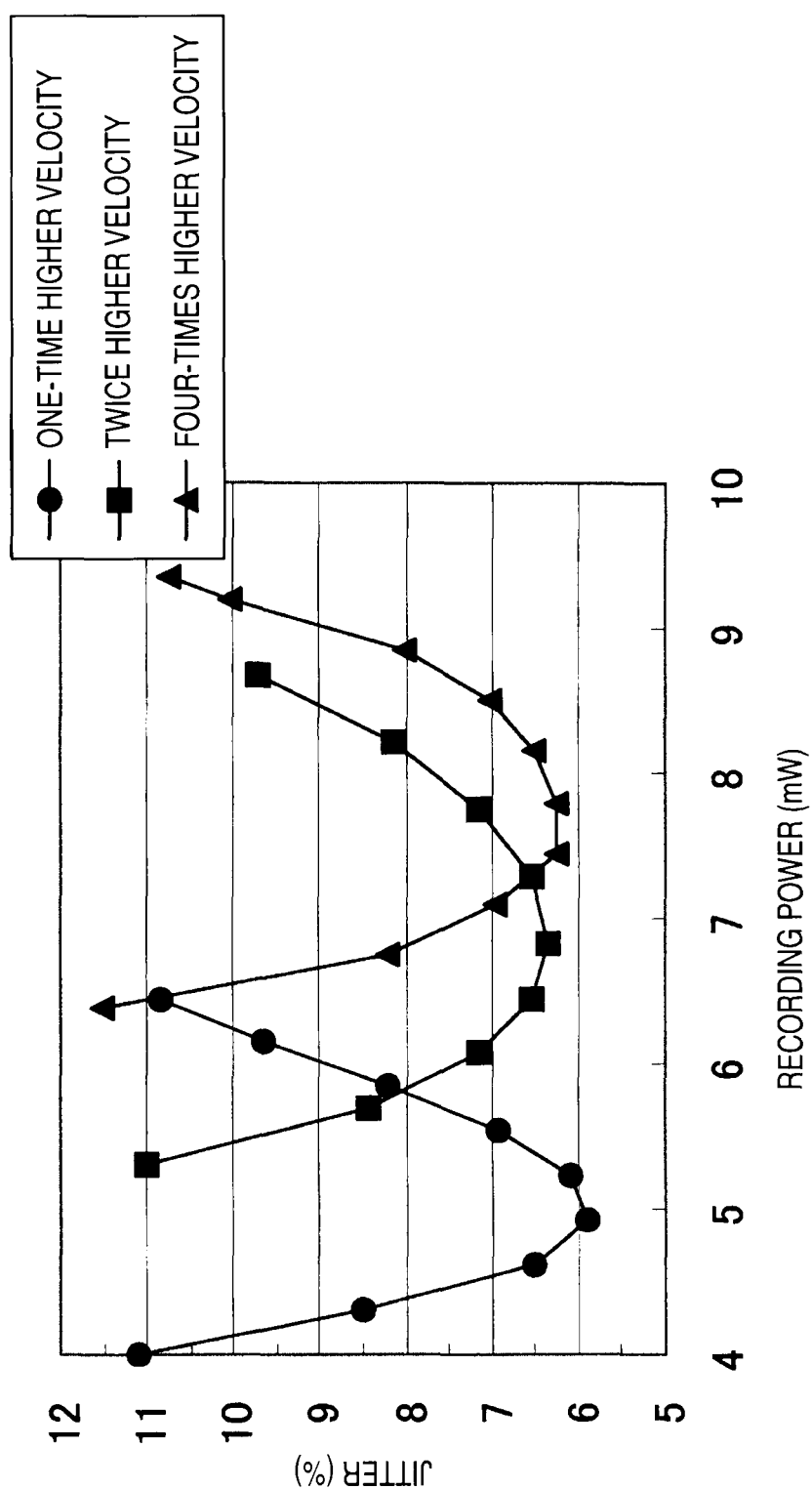
FIG. 3 is a schematic line graph showing a change in a jitter with respect to the recording power for the optical information recording medium in accordance with the example 1.

FIG. 2 and FIG. 3 show the results of recording/reading measurement. As seen from FIG. 2, the optical information recording medium 1 has high recording sensitivity under any linear velocity, and exhibits quite excellent recording and reading properties. As seen from FIG. 3, when a jitter of 8.5% is regarded as the upper limit, a margin for a variation in a recording power is wide enough to tolerate a power variation of about ±15% under any linear velocity. Thus, the optical information recording medium has a sufficiently wide power margin.

Figure 4:
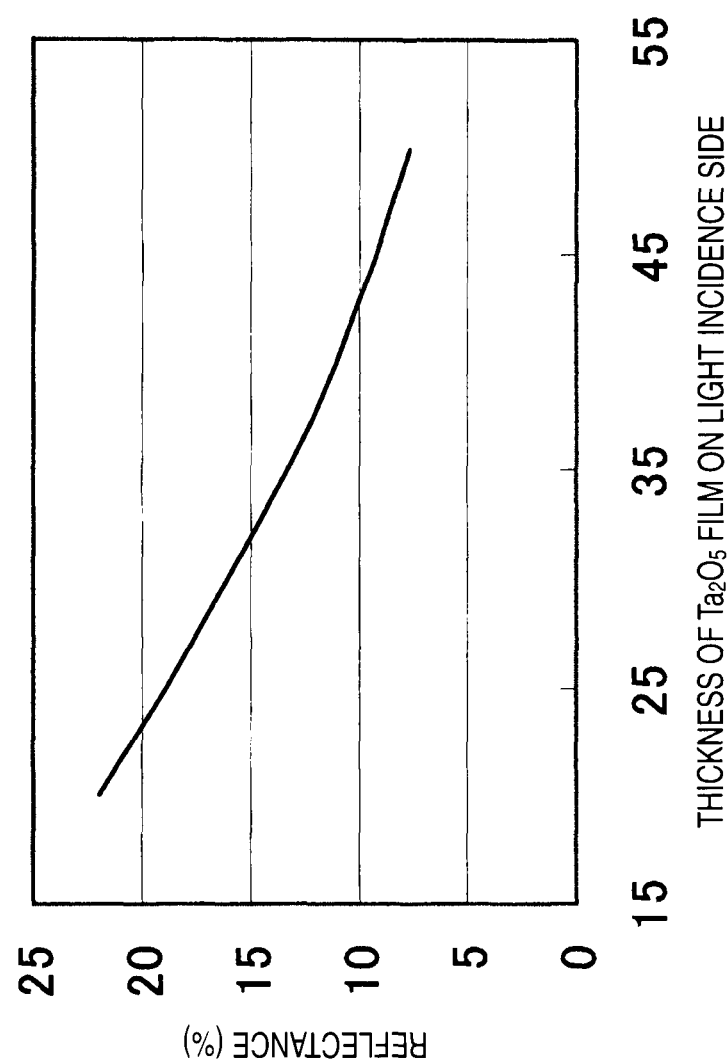
FIG. 4 is a schematic line graph showing the relationship between the thickness of a $Ta_2OS$ film, which is used as a protective layer on the side of the optical information recording medium in accordance with the example 1 on which recording/reading laser light falls, and a reflectance.

The reflectance of the optical information recording medium 1 was 16%. If a higher reflectance was needed, a reflectance of 20% or more could be, as shown in FIG. 4, provided by controlling the thickness of the $Ta_2O_5$ film that was used as the protective layer 14 on the side on which recording/reading laser light falls. Thus, a signal property can be further improved by optimizing optical thermal properties.

Figure 5:
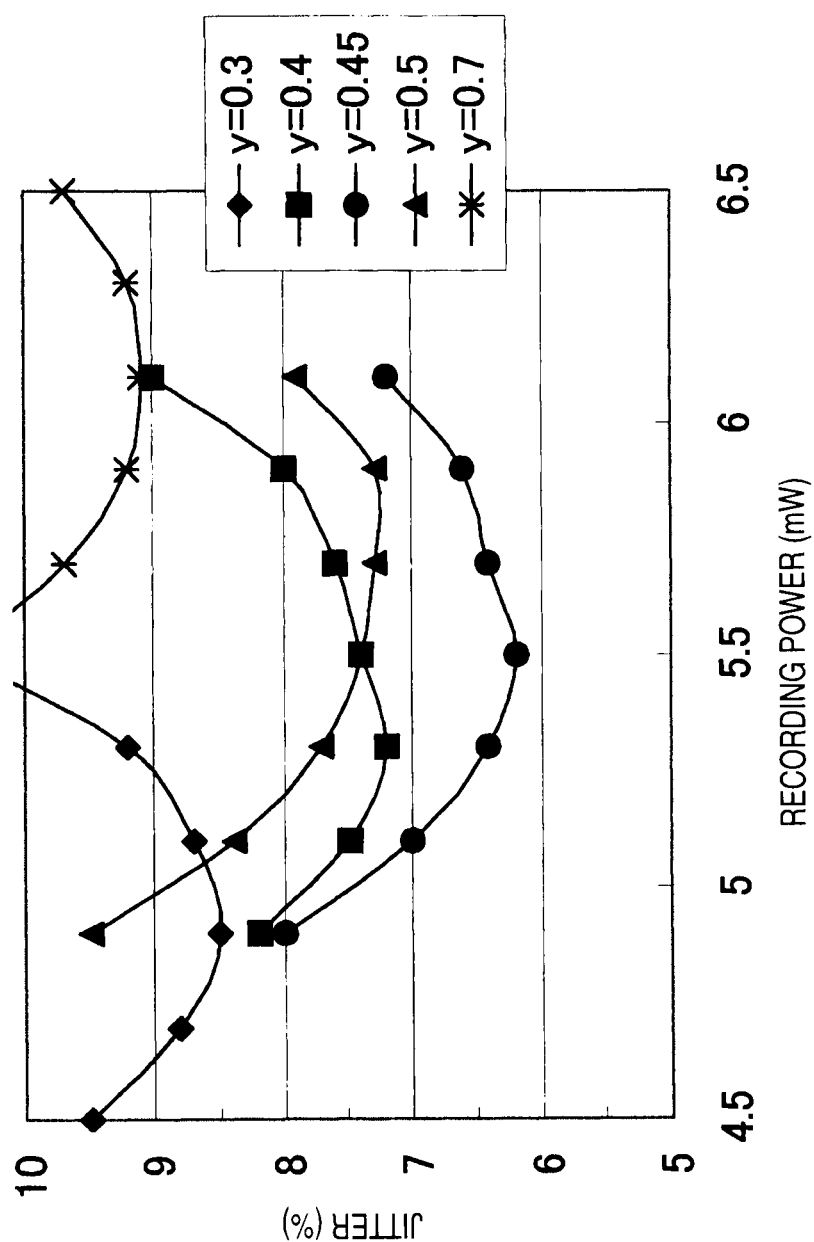
FIG. 5 is a schematic line graph showing the relationship between the composition of a recording layer of the optical information recording medium in accordance with the example 1 and recording and reading properties.
Figure 6:
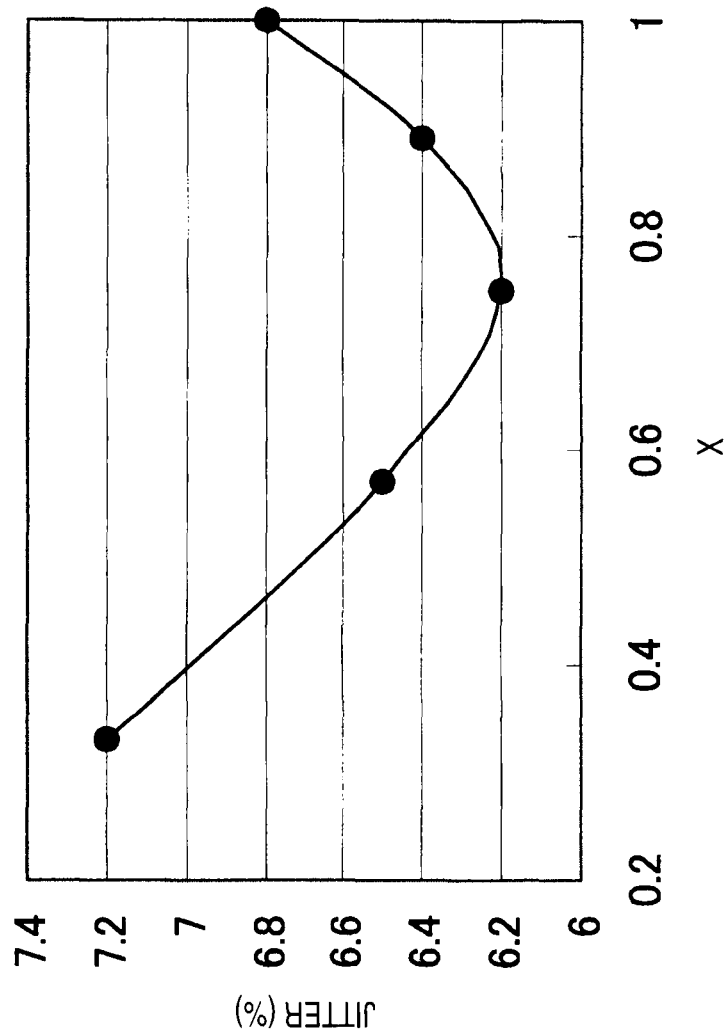
FIG. 6 is a schematic line graph showing the relationship between the composition of the recording layer of the optical information recording medium in accordance with the example 1 and recording and reading properties.

FIG. 5 shows a change in a jitter occurring when y in the formula (1) expressing the composition of the recording layer 13 is changed, and FIG. 6 shows a change in the jitter occurring when x in the formula (1) is changed with y therein fixed at 0.4. FIG. 5 and FIG. 6 demonstrate that a low jitter is provided under $0<x\leq1.0$ and $0.3\leq y\leq0.7$. Moreover, Table 1 shows a change in recording and reading properties occurring when an element X in the formula (1) is changed. Table 1 also shows as a comparative example the results of measurement of the recording and reading properties which are obtained with Mg adopted as X. Table 1 demonstrates that: when the element X in the formula (1) is Ga, Te, V, Si, Zn, Ta, or Tb, excellent recording and reading properties are provided; but in the comparative example where X is Mg, the excellent recording and reading properties are not provided. Table 2 shows a change in the recording and reading properties occurring when z is changed in a case where the composition of the recording layer 13 is expressed as $[(ZnS)_{0.8}(SiO_2)_{0.2}]_{0.4}(Sb_xGa_{1-x})_{0.6}$. Table 2 demonstrates that when z in the formula (1) meets $0.8<z\leq1.0$, the excellent recording and reading properties are provided.

TABLE 1

|  | X | Modulation | Jitter | Reading durability | Environmental durability |
|---|---|---|---|---|---|
| Example | 1-1 Ga | 0.52 | ◎ | ○ | ◎ |
|  | 1-2 Te | 0.61 | ◎ | Δ | ○ |
|  | 1-3 V | 0.42 | ◎ | ◎ | ◎ |
|  | 1-4 Si | 0.53 | ◎ | ◎ | ◎ |
|  | 1-5 Zn | 0.61 | ◎ | ◎ | ◎ |
|  | 1-6 Ta | 0.51 | ○ | ◎ | ◎ |
|  | 1-7 Tb | 0.47 | ○ | ◎ | ◎ |
| Comparative example | Mg | 0.62 | Δ | X | X |

◎ Quite excellent,
○ Excellent,
Δ Little inferior,
X Inferior

TABLE 2

| z | Modulation | Jitter | Reading durability | Environmental durability |
|---|---|---|---|---|
| 1.0 | ◎ | ○ | ◎ | ◎ |
| 0.9 | ◎ | ◎ | ◎ | ◎ |
| 0.8 | ○ | ◎ | Δ | ○ |
| 0.7 | X | Δ | X | X |

◎ Quite excellent,
○ Excellent,
Δ Little inferior,
X Inferior

As seen from FIG. 5, FIG. 6, Table 1, and Table 2, the recording and reading properties can be changed by changing the composition of the recording layer 13. FIG. 5 demonstrates that when $0.3\leq y\leq0.7$, or more particularly, $0.4\leq y\leq0.5$ is met, an especially low jitter is provided. Moreover, FIG. 6 demonstrates that: when $0<x\leq1.0$ is met, if x ranges approximately 0.4 to 1.0, an especially low jitter is provided; and when x ranges approximately 0.6 to approximately 0.9, a much lower jitter is provided.

Figure 7:
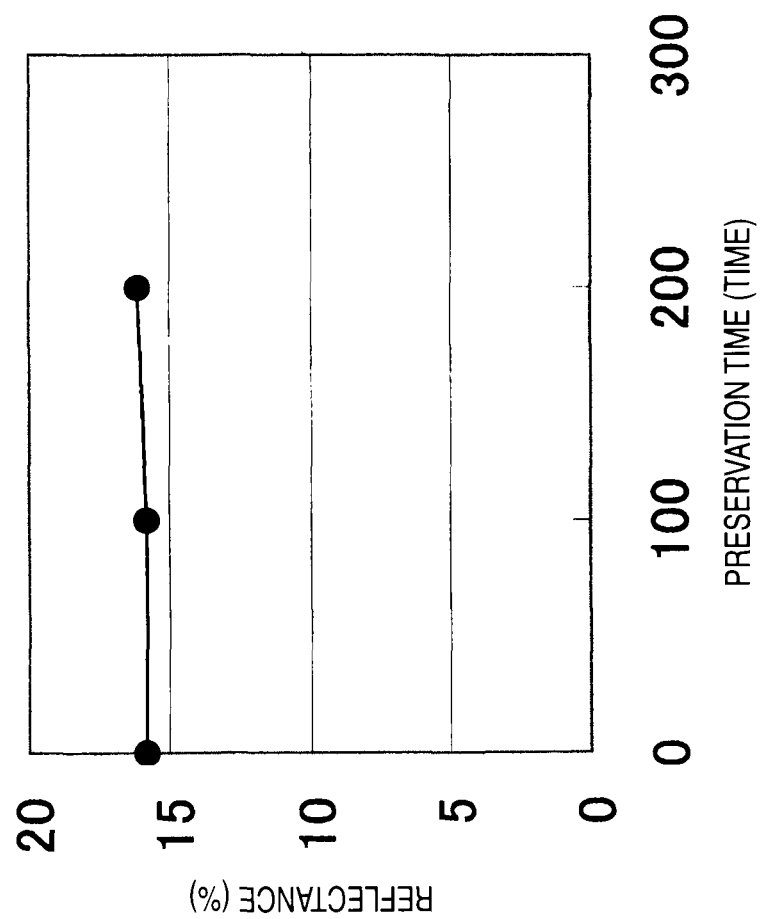
FIG. 7 is a schematic line graph showing the reflectances observed before and after the optical information recording medium in accordance with the example 1 is preserved in an environment of 80° C. and 85% RH for 200 hours.
Figure 8:
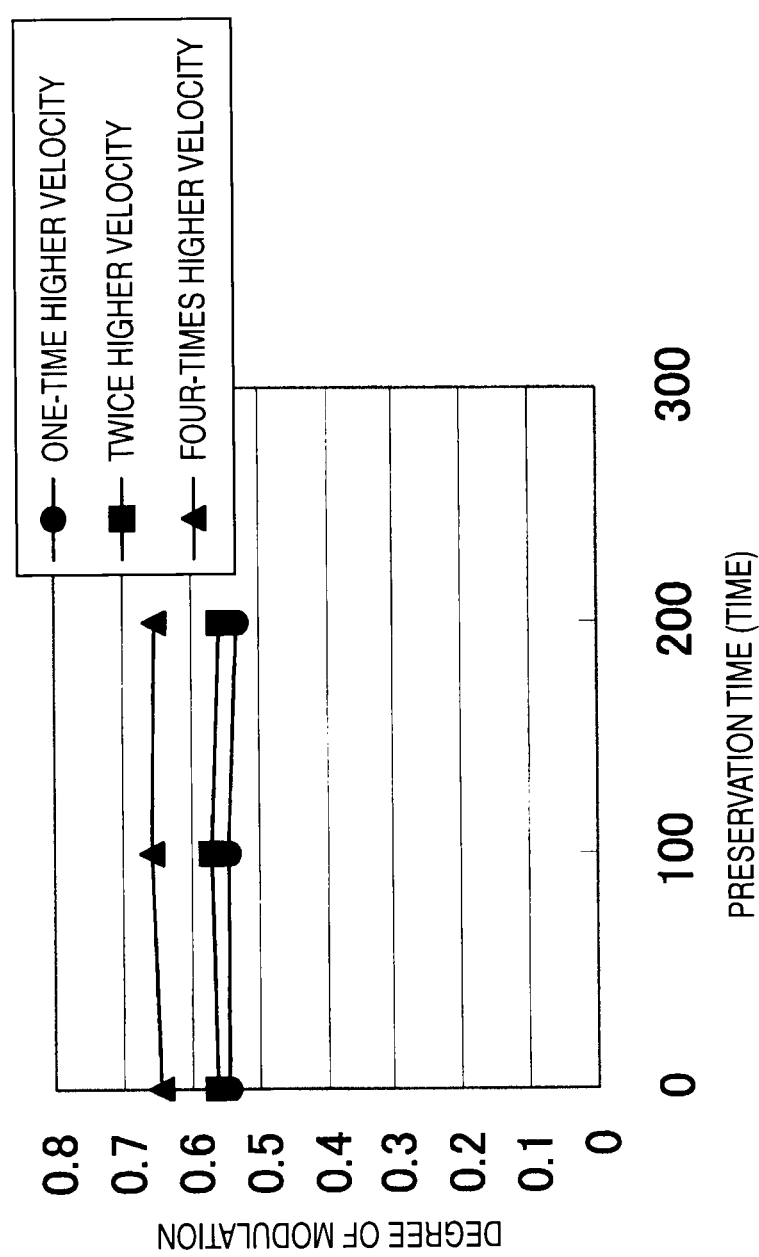
FIG. 8 is a schematic line graph showing modulation observed before and after the optical information recording medium in accordance with the example 1 is preserved in the environment of 80° C. and 85% RH for 200 hours.
Figure 9:
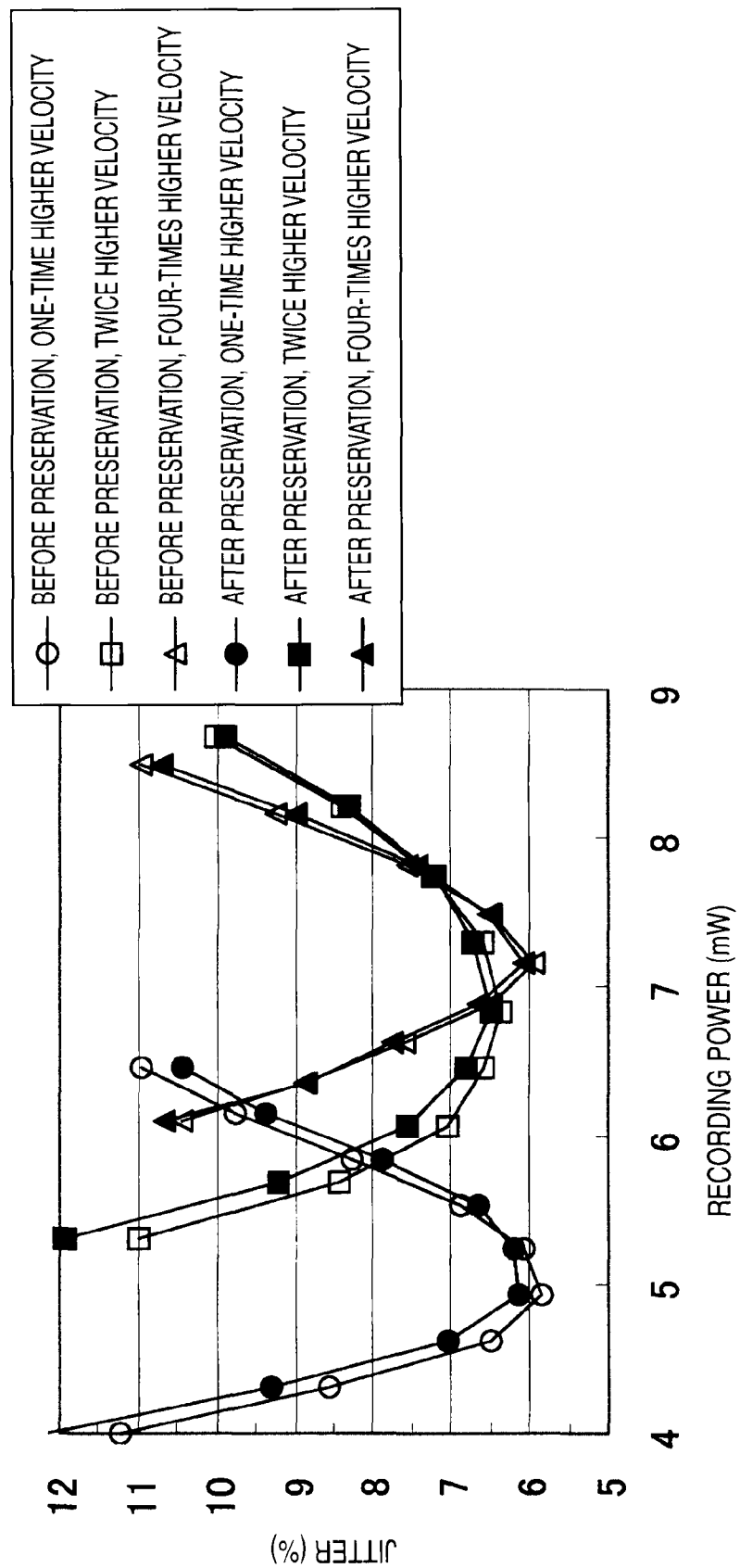
FIG. 9 is a schematic line graph showing a change in a jitter with respect to a recording power observed before and after the optical information recording medium in accordance with the example 1 is preserved in the environment of 80° C. and 85% RH for 200 hours.

The optical information recording medium 1 in accordance with the example 1 was put into a thermo-hygrostat of 80° C. and 85% RH after predetermined recording was performed thereon. Thereafter, when 200 hours elapsed, the recording and reading properties identical to the foregoing ones were measured. As a result, as shown in FIG. 7, FIG. 8, and FIG. 9, the measured values of a reflectance, modulation, and a jitter did not change from those measured before the optical information recording medium was put into the thermo-hygrostat. The measured values of a recording sensitivity and a C/N also did not change from those measured before the optical information recording medium was put into the thermo-hygrostat, though they are not shown. Consequently, the optical information recording medium 1 can apparently retain the excellent properties for a long period even under a severe environment.

Figure 10:
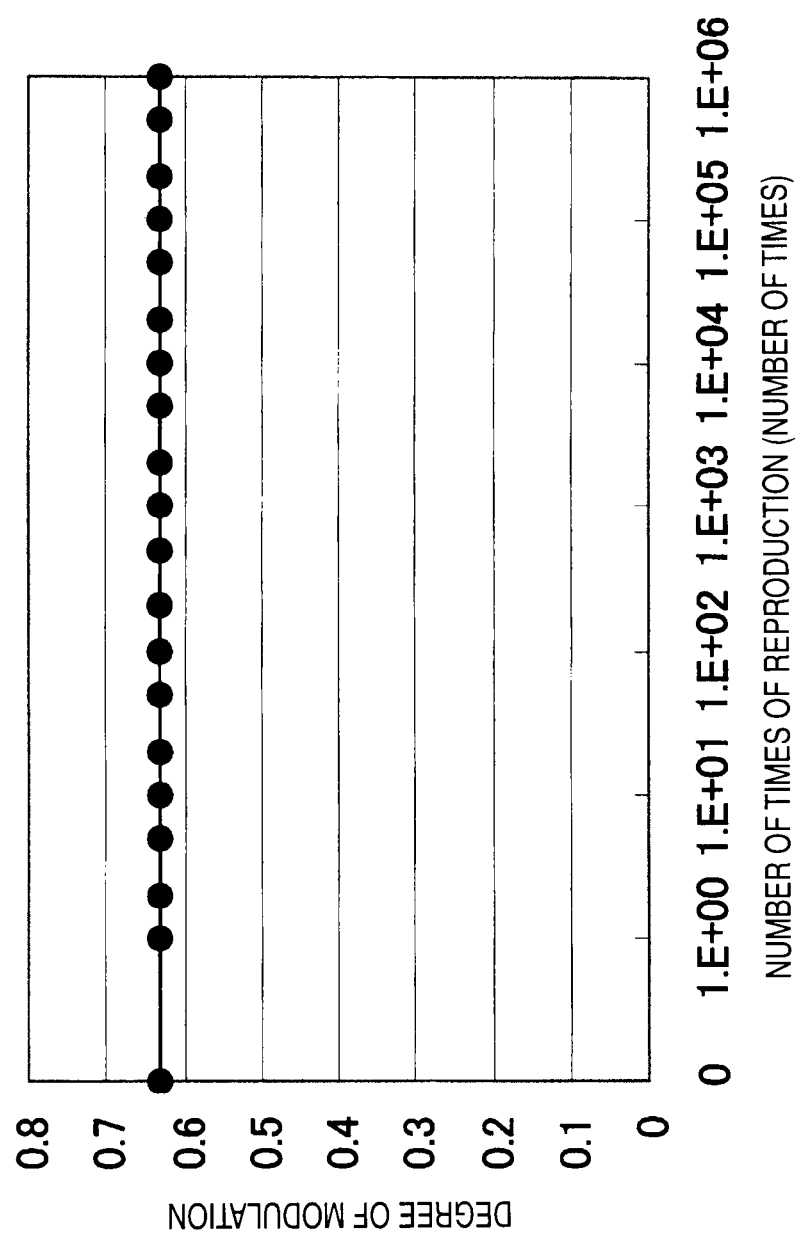
FIG. 10 is a schematic line graph showing a change in modulation observed in a case where reading is performed on the optical information recording medium in accordance with the example 1 one million times at a linear velocity of 19.68 m/s with 0.6 mW.
Figure 11:
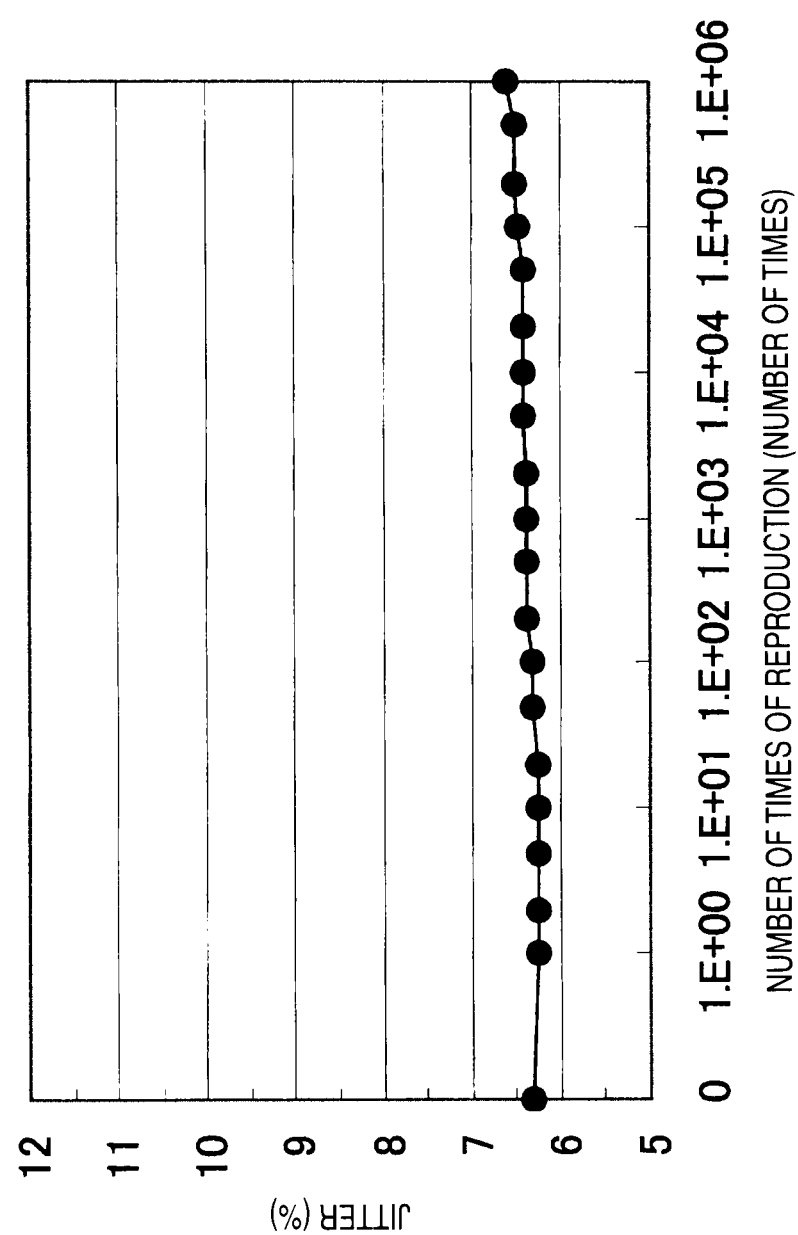
FIG. 11 is a schematic line graph showing a change in a jitter observed in a case where reading is performed on the optical information recording medium in accordance with the example 1 one million times at a linear velocity of 19.68 m/s with 0.6 mW.

Predetermined recording was performed on the optical information recording medium 1 in accordance with the example 1, and reading was performed under a reading power condition severer than usual. As shown in FIG. 10 and FIG. 11, even when reading was performed one million times with 0.6 mW at a quadruple linear velocity of 19.68 m/x, a jitter and modulation did not change. Consequently, the optical information recording medium 1 can apparently retain the satisfactory recording state for a long period even during repeated reading.

As mentioned above, according to the first embodiment, when the recording layer 13 contains ZnS, $SiO_2$, and Sb as principal components and has preferably the composition expressed as the formula (1), a write-once optical information recording medium in which: recorded information is stably preserved for a long period as it initially is; a signal is not impaired by reading laser light during signal reading; a writing property is retained without degeneration caused by normal long-term preservation; excellent sensitivity and an excellent response speed are provided; and excellent recording and reading signal properties can be realized with respect to a wide range of linear velocities or recording powers can be inexpensively provided. The write-once optical information recording medium is preferably applied to a case where laser light whose wavelength is equal to or larger than 385 nm and equal to or smaller than 415 nm is used for recording/reading.

Next, an optical information recording medium in accordance with the second embodiment of the present invention will be described below.

Figure 12:
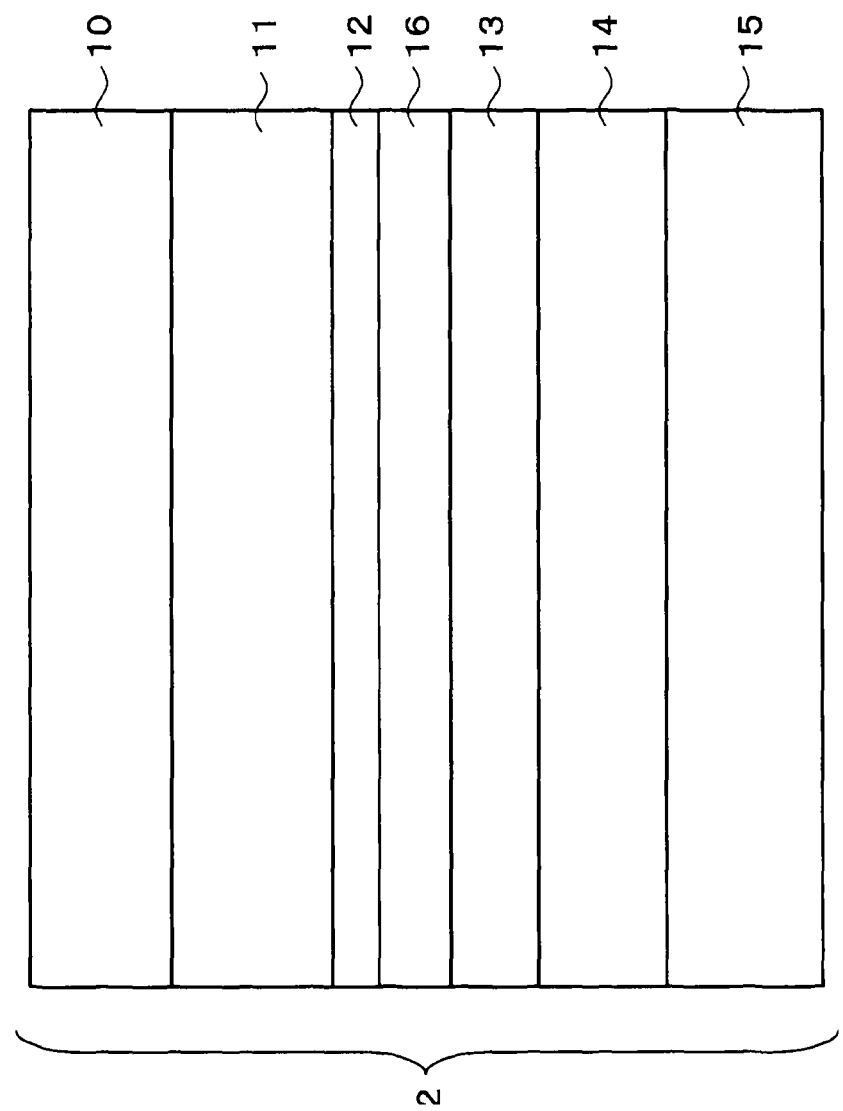
FIG. 12 is a schematic sectional view showing the major portion of an optical information recording medium in accordance with the second embodiment of the present invention.

FIG. 12 shows the optical information recording medium 2.

As shown in FIG. 12, in the optical information recording medium 2, similarly to the optical information recording medium 1 of the first embodiment, a reflective layer 11, a protective layer 12, a recording layer 13, a protective layer 14, and a light transmissive protective layer 15 are layered on a substrate 10. In addition, a protective layer 16 is interposed between the protective layer 12 and recording layer 13. The protective layer 16 is intended to prevent the material of the reflective layer 12, for example, an Ag alloy film and ZnS—SiO$_2$ of the recording layer 13 from reacting on each other. A protective layer having the capability of a barrier against an Ag atom or the like of, for example, an SiN film is employed.

In the second embodiment, the construction other than the above point is identical to that of the first embodiment.

According to the second embodiment, the same advantage as that of the first embodiment can be provided.

Next, an optical information recording medium in accordance with the third embodiment of the present invention will be described below.

Figure 13:
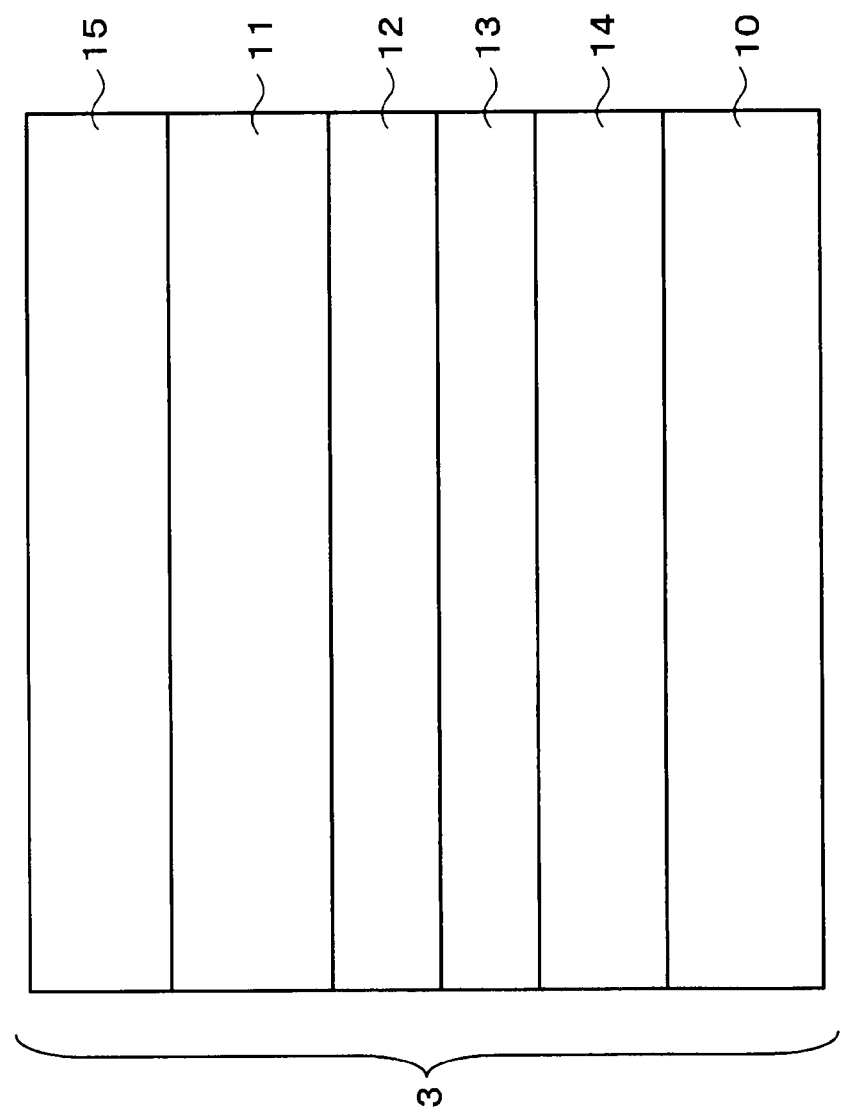
FIG. 13 is a schematic sectional view showing the major portion of an optical information recording medium in accordance with the third embodiment of the present invention.

FIG. 13 shows the optical information recording medium 3.

As shown in FIG. 13, in the optical information recording medium 3, the order in which a reflective layer 11, a protective layer 12, a recording layer 13, and a protective layer 14 are layered is reverse to that in the optical information recording medium 1 in accordance with the first embodiment. Specifically, in the optical information recording medium 3, the protective layer 14, recording layer 13, protective layer 12, and reflective layer 11 are sequentially layered on a substrate 10, and a light transmissive protective layer 15 is layered on the uppermost layer of the reflective layer 11. Recording/reading is performed on the optical information recording medium 3 by causing laser light to enter or leave the substrate 10 side. In this case, as the material of the substrate 10, a material that hardly exhibits absorbency with respect to recording/reading laser light, for example, a plastic material such as polycarbonate or an acrylic resin is adopted.

In the third embodiment, the construction other than the above point is identical to that of the first embodiment.

According to the third embodiment, the same advantage as that of the first embodiment can be provided.

Next, an optical information recording medium in accordance with the fourth embodiment of the present invention will be described below.

Figure 14:
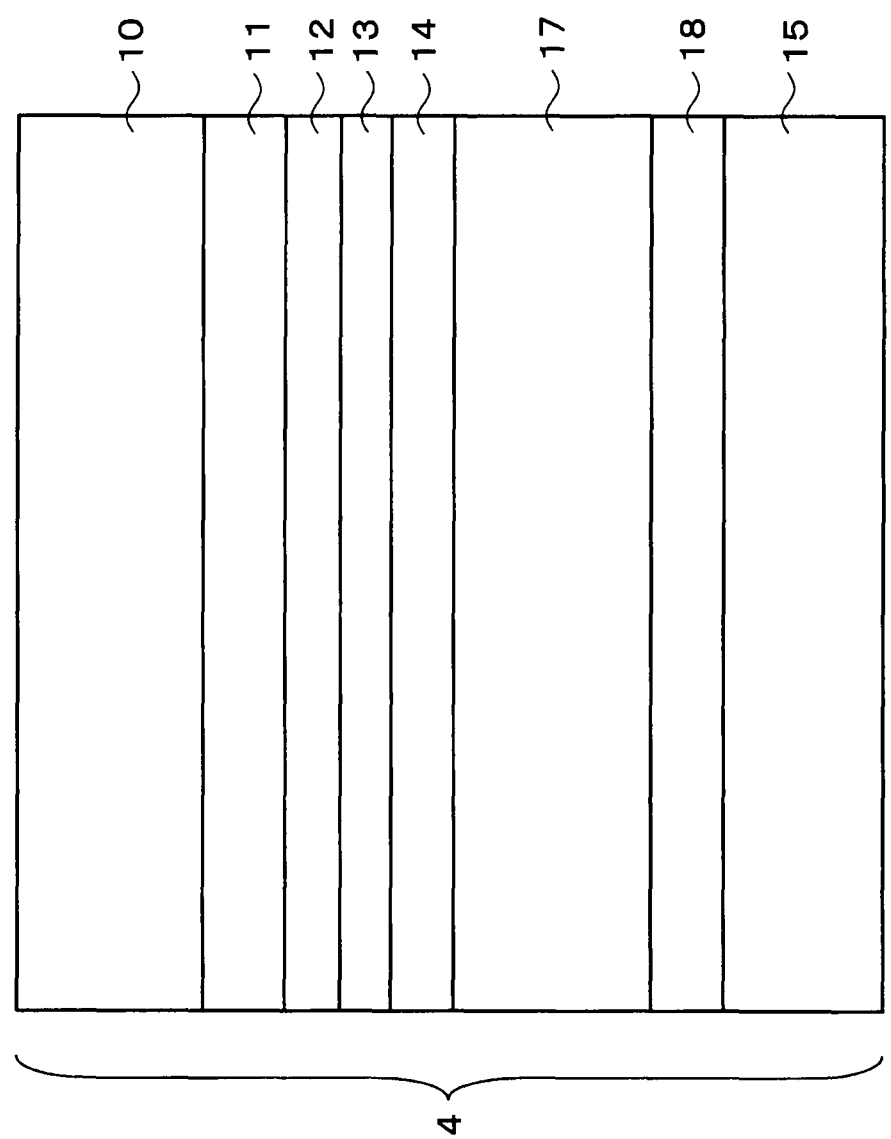
FIG. 14 is a schematic sectional view showing the major portion of an optical information recording medium in accordance with the fourth embodiment of the present invention.

FIG. 14 shows the optical information recording medium 4.

As shown in FIG. 14, in the optical information recording medium 4, similarly to the optical information recording medium 1 in accordance with the first embodiment, a reflective layer 11, a protective layer 12, a recording layer 13, and a protective layer 14 are sequentially layered on a substrate 10. However, it is different from the optical information recording medium 1 in accordance with the first embodiment that an intermediate layer 17 and a recording layer 18 are sequentially layered on the protective layer 14, and that a light transmissive protective layer 15 is layered on the recording layer 18. The optical information recording medium 4 is a two-layer optical information recording medium including two layers of recording layers 13 and 18. Recording/reading is performed on the optical information recording medium 4 by causing laser light to enter or leave the light transmissive protective layer 15 side.

The intermediate layer 17 can be formed by, for example, applying an ultraviolet curable resin, which does not exhibit absorbency in the wavelength band of laser light used for recording/reading after being cured, by a desired thickness (for example, 20 to 30 μm) using a spin coater or the like, or by bonding a light curable PSA, which does not exhibit absorbency in the wavelength band of laser light used for recording/reading after being cured, and then performing ultraviolet irradiation. A substrate having concavo-convex groove tracks may be used to transfer the concavo-convex groove tracks during ultraviolet irradiation.

The second recording layer 18 is constructed to exhibit a sufficiently high transmittance that permits recording/reading laser light to enter or leave the first recording layer 13 through the second recording layer so as to perform recording or reading. The recording layer 18 may be a recording layer of a write-once type or a rewritable type or may be a recording layer permitting reading alone.

EXAMPLE 2

The optical information recording medium 4 on which recording/reading is performed by an optical disk recording/reading apparatus employing two groups of objective lenses that have a numerical aperture of 0.85 and a semiconductor laser light source that emits light at a wavelength of 405 nm within the wavelength band of blue violet was fabricated as mentioned below.

As the substrate 10, a polycarbonate substrate having grooves, which had a thickness of 1.1 mm, a track pitch of 0.32 μm, and a groove depth of 20 nm, on one side thereof was fabricated using an injection mold. On the polycarbonate substrate, an Ag alloy film of 100 nm thick serving as the reflective layer 11, a Ta$_2$O$_5$ film of 30 nm thick serving as the protective layer 12, the recording layer 13 of 20 nm thick, and a Ta$_2$O$_5$ film of 30 nm thick serving as the protective layer 14 were sequentially formed according to the sputtering method. After an adhesive of an ultraviolet curable type was applied to the Ta$_2$O$_5$ film of the uppermost layer by a thickness of 25 Mm according to the spin coat method, a polycarbonate stamper was used to transfer groove tracks, and ultraviolet irradiation was performed in order to form the intermediate layer 17. The second recording layer 18 was formed on the intermediate layer 17. Further, after an adhesive of an ultraviolet curable type was applied to the recording layer 18 by a thickness of 15 μm according to the spin coat method, a polycarbonate light transmissive sheet (film) of 85 μm thick is placed, and ultraviolet irradiation was performed in order to form the light transmissive protective layer 15. Thus, the optical information recording medium 4 was fabricated.

The thus fabricated optical information recording medium 4 was measured. For measurement, an ODU-1000 (laser light wavelength: 405 nm) manufactured by Pulstec Industrial Co., Ltd., a spectrum analyzer R3267 manufactured by Advantest Corp., and a jitter analyzer LE1876 manufactured by Leader Electronics Corp. were employed. Signal measurement was performed on the optical information recording medium 4 under a linear velocity of 4.92 m/s and a channel bit length of 74.50 nm which were conformable to the standard for the Blu-ray Disc DL50 GB density. Signal recording was performed at, in addition to the linear velocity of 4.92 m/s, a double linear velocity of 9.84 m/s and a quadruple linear velocity of 19.68 m/s. For jitter measurement, a signal having been treated by a limit equalizer manufactured by Pulstec Industrial Co., Ltd. was used. The equalizer gain was 7.0 dB.

Recording/reading measurement was performed on the optical information recording medium 4. Under a reflectance of 4.6% and a linear velocity of 4.92 m/s (velocity that is one time higher), when a recording power was 9.1 mW, a jitter was 6.3%. When modulation was defined as (I8H-I8L)/I8H in relation to a signal level of 18H for each 8T space part and a signal level of I8L for each 8T mark part, the value was 57%. Thus, the optical information recording medium 4 exhibited quite excellent recording and reading properties.

Under a double linear velocity of 9.84 m/s (velocity that is twice higher), when the recording power was 6.8 mW, the jitter was 6.5% and the modulation was 58%. Under a quadruple linear velocity of 19.68 m/s (velocity that is four times higher), when the recording power was 11.9 mW, the jitter was 6.5% and the modulation was 65%.

Figure 15:
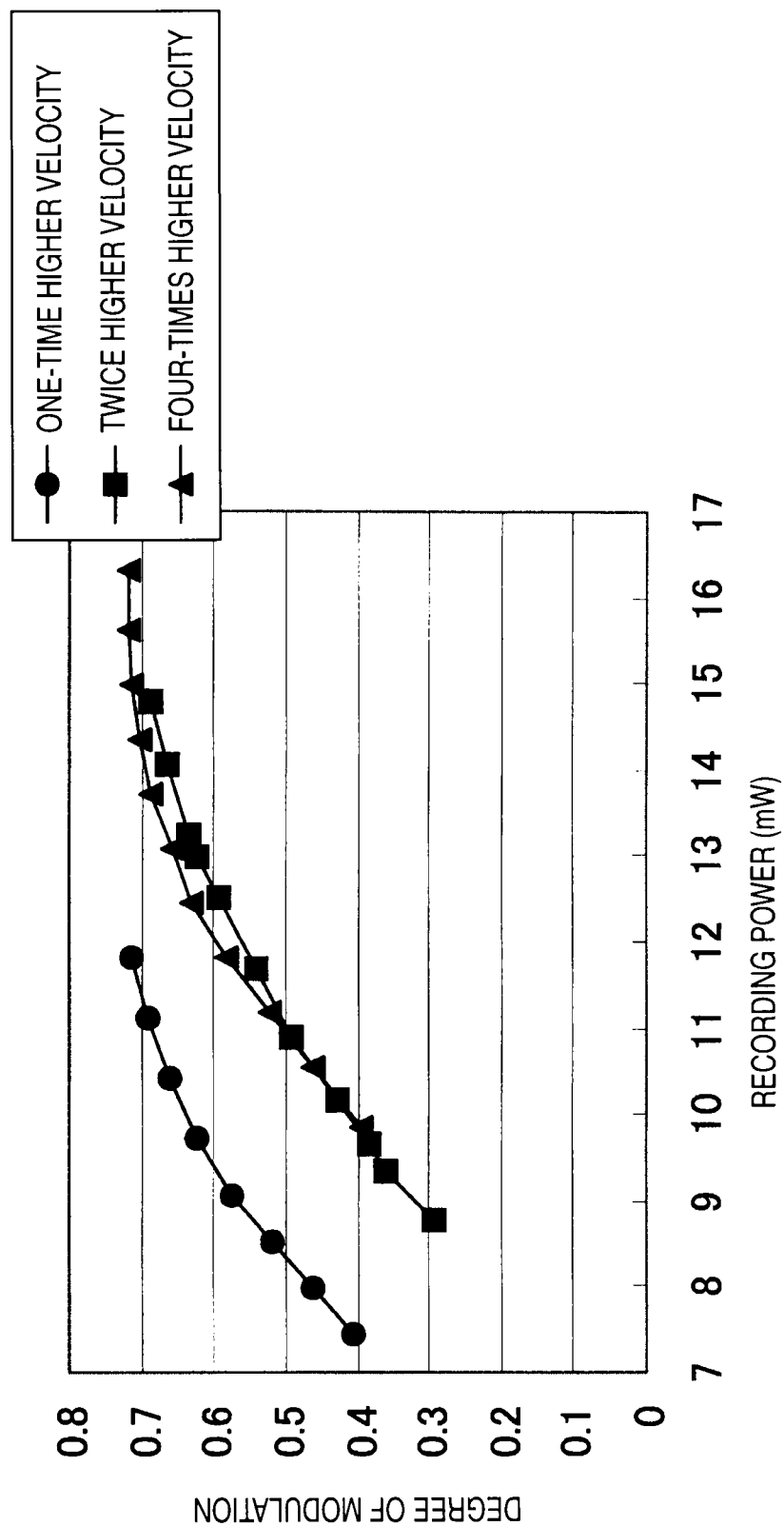
FIG. 15 is a schematic line graph showing a change in modulation with respect to a recording power for an optical information recording medium in accordance with an example 2.
Figure 16:
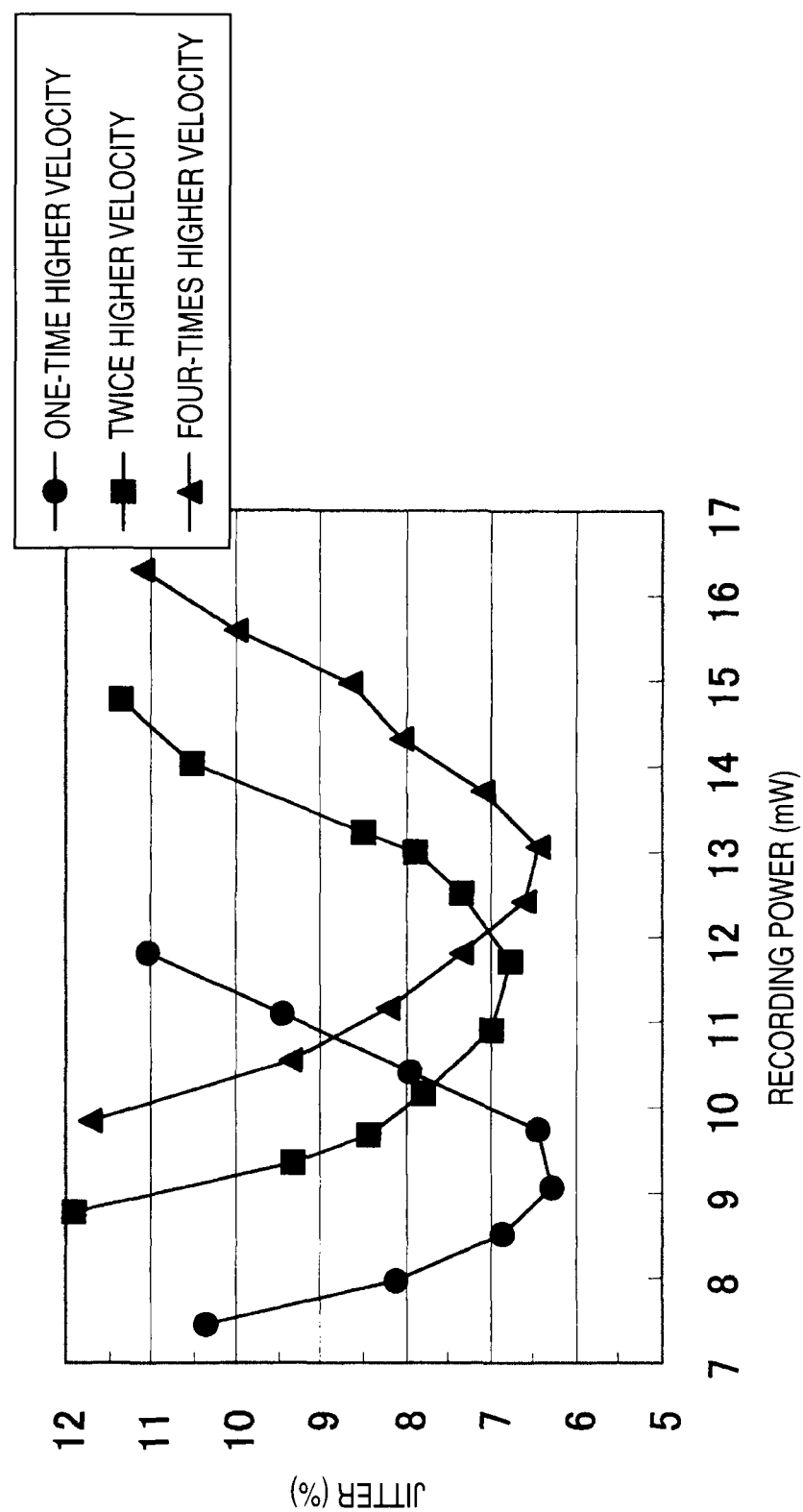
FIG. 16 is a schematic line graph showing a change in a jitter with respect to the recording power for the optical information recording medium in accordance with the example 2.

FIG. 15 and FIG. 16 show the results of recording/reading measurement. As seen from FIG. 15, the optical information recording medium 4 has high recording sensitivity with respect to any of linear velocities and exhibits quite excellent recording and reading properties. As seen from FIG. 16, assuming a jitter of 8.5% is the upper limit, a margin for a variation in a recording power is wide enough to tolerate a power variation of about ±15% under any linear velocity. Thus, the optical information recording medium 4 has a sufficiently wide power margin.

According to the fourth embodiment, a two-layer write-once optical information recording medium having the same advantage as that of the first embodiment can be inexpensively provided.

Next, an optical information recording medium in accordance with the fifth embodiment of the present invention will be described below.

Figure 17:
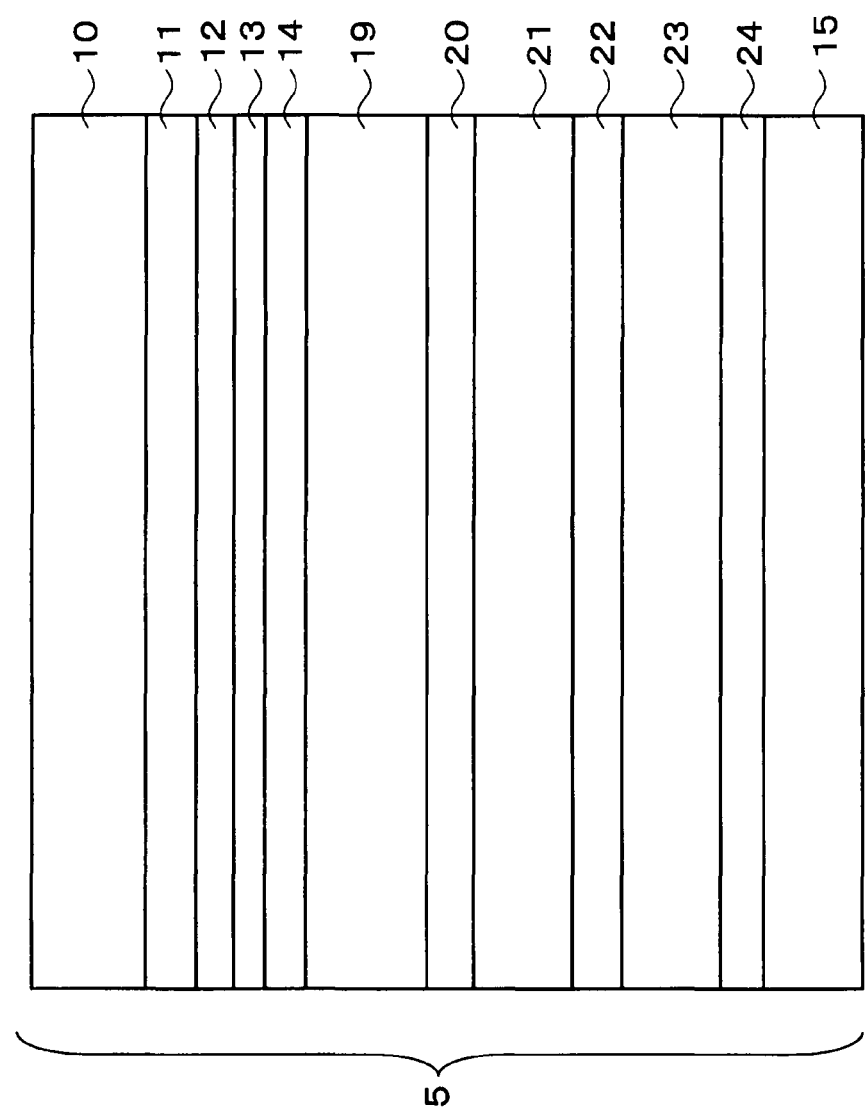
FIG. 17 is a schematic sectional view showing the major portion of an optical information recording medium in accordance with the fifth embodiment of the present invention.

FIG. 17 shows the optical information recording medium 5.

As shown in FIG. 17, in the optical information recording medium 5, similarly to the optical information recording medium 1 of the first embodiment, a reflective layer 11, a protective layer 12, a recording layer 13, and a protective layer 14 are sequentially layered on a substrate 10. A difference from the optical information recording medium 1 in accordance with the first embodiment lies in a point that: an intermediate layer 19, a recording layer 20, an intermediate layer 21, a recording layer 22, an intermediate layer 23, and a recording layer 24 are further sequentially layered on the protective layer 14; and a light transmissive protective layer 15 is layered on the recording layer 24. The optical information recording medium 4 is a four-layer optical information recording medium having four layers of recording layers 13, 20, 22, and 24. Recording/reading is performed on the optical information recording medium 4 by causing laser light to enter or leave the light transmissive protective layer 15 side.

The intermediate layers 19, 21, and 23 can be formed by applying an ultraviolet curable resin, which does not exhibit absorbency within the wavelength band of laser light used for recording/reading after being cured, by a desired thickness (for example, ranging from 20 to 30 µm) using a spin coater or the like, or bonding a light curable PSA which does not exhibit absorbency within the wavelength band of laser light used for recording/reading after being cured, and then performing ultraviolet irradiation. A substrate having concavo-convex groove tracks may be used to transfer the concavo-convex groove tracks during ultraviolet irradiation.

The second recording layer 20, third recording layer 22, and fourth recording layer 24 are constructed to exhibit a transmittance that is high enough to permit recording/reading laser light to enter or leave the first recording layer 13 through the recording layers so as to enable recording and reading. The recording layers 20, 22, and 24 may be recording layers of a write-once type or a rewritable type or may be recording layers permitting reading alone.

According to the fifth embodiment, a four-layer write-once optical information recording medium having the same advantage as that of the first embodiment can be inexpensively provided.

The embodiments of the present invention have been concretely described so far. However, the present invention is not limited to the embodiments. Various variants can be produced based on the technological idea of the present invention.

For example, the numerical values, materials, structures, and shapes employed in the first to fifth embodiments and examples 1 and 2 are mere examples. If necessary, different numerical values, materials, structures, and shapes may be adopted.

The invention claimed is:

1. An optical information recording medium comprising:
   a recording layer consisting of a composition that satisfies the following formula (1):

$$[(ZnS)_x(SiO_2)_{1-x}]_y(Sb_zX_{1-z})_{1-y} \qquad (1), \text{where}$$

$0<x<1.0$, $0.3 \leq y \leq 0.7$, and $0.8<z<1.0$ are met, and
   X denotes at least one element selected from the group of Ga, V, Si, Zn, Ta, and Tb.

2. The optical information recording medium according to claim 1 characterized in that the thickness of the recording layer is equal to or larger than 3 nm and equal to or smaller than 40 nm.

3. The optical information recording medium according to claim 1 characterized in that the optical information recording medium has the recording layer on a substrate.

4. The optical information recording medium according to claim 3 characterized in that the optical information recording medium has a reflective layer between the substrate and recording layer, and recording and/or reproducing laser light enters the recording layer side.

5. The optical information recording medium according To claim 4 characterized in that the reflective layer is made of a metal and/or a semi-metal.

6. The optical information recording medium according to claim 3 characterized in that:
   the optical information recording medium includes a reflective layer which is interposed between the substrate and recording layer, and a protective layer which is interposed between the reflective layer and recording layer in contact with the surface of the recording layer on one side thereof and is formed with a dielectric; and
   recording and/or reproducing laser light enters the recording layer side.

7. The optical information recording medium according to claim 3 characterized in that:
   the optical information recording medium includes a reflective layer which is interposed between the substrate and recording layer, a first protective layer which is interposed between the reflective layer and recording layer in contact with the surface of the recording layer on one side thereof and is formed with a dielectric, and a second protective layer which is placed in contact with the surface of the recording layer on the side thereof opposite to the substrate and is formed with a dielectric; and recording and/or reproducing layer light enters the recording layer side.

8. The optical information recording medium according to claim 1 characterized in that the optical information recording medium includes a protective layer which is placed in contact with the surface of the recording layer at least on one side thereof and is formed with a dielectric.

9. The optical information recording medium according to claim 1 characterized in that the optical information recording medium includes a plurality of recording layers.

10. The optical information recording medium according to claim 1, wherein X denotes at least one element selected from the group of V, Si, and Zn.

11. The optical information recording medium according to claim 1, wherein X denotes Zn.

12. The optical information recording medium according to claim 11, wherein x =0.8, y =0.5, and z =0.9.

13. A recording and/or reproducing method for an optical information recording medium, which includes a recording layer, the method comprising:

causing laser light whose wavelength is equal to or larger than 385 nm and equal to or smaller than 415 nm to enter the recording layer to perform recording and/or reproducing, wherein the recording layer consists of a composition which satisfies the following formula (1):

$$[(ZnS)_x(SiO_2)_{1-x}]_y(Sb_zX_{1-z})_{1-y} \qquad (1), \text{where}$$

$0<x<1.0$, $0.3 \leq y \leq 0.7$, and $0.8<z<1.0$ are met, and

X denotes at least one element selected from the group of Ga, V, Si, Zn, Ta, and Tb.

14. The method according to claim 13, wherein $0.8<z<1.0$ is met.

* * * * *